United States Patent [19]

Lassander et al.

[11] 4,403,328

[45] Sep. 6, 1983

[54] DC ARC FURNACE POWER CONNECTION SYSTEM

[75] Inventors: Erik Lassander, Viken; Sven-Einar Stenkvist, Västeras, both of Sweden

[73] Assignee: ASEA AB, Västeras, Sweden

[21] Appl. No.: 349,602

[22] Filed: Feb. 17, 1982

[30] Foreign Application Priority Data

Feb. 26, 1981 [SE] Sweden ................................ 8101251

[51] Int. Cl.³ ............................................. H05B 7/11
[52] U.S. Cl. .................................... 373/103; 373/108; 373/48
[58] Field of Search ............... 373/108, 107, 103, 102, 373/48, 47

[56] References Cited

U.S. PATENT DOCUMENTS

| | | | |
|---|---|---|---|
| 1,496,299 | 6/1924 | Clifford | 373/102 |
| 4,110,546 | 8/1978 | Stenkvist | 373/107 |
| 4,262,159 | 4/1981 | Gröf | 373/48 |
| 4,356,340 | 10/1982 | Stenkvist | 373/108 |

Primary Examiner—Roy N. Envall, Jr.
Attorney, Agent, or Firm—Kenyon & Kenyon

[57] ABSTRACT

A DC arc furnace has power lines arranged completely symmetrically with respect to the arc so as to prevent the arc from bending angularly.

2 Claims, 3 Drawing Figures

U.S. Patent  Sep. 6, 1983  4,403,328
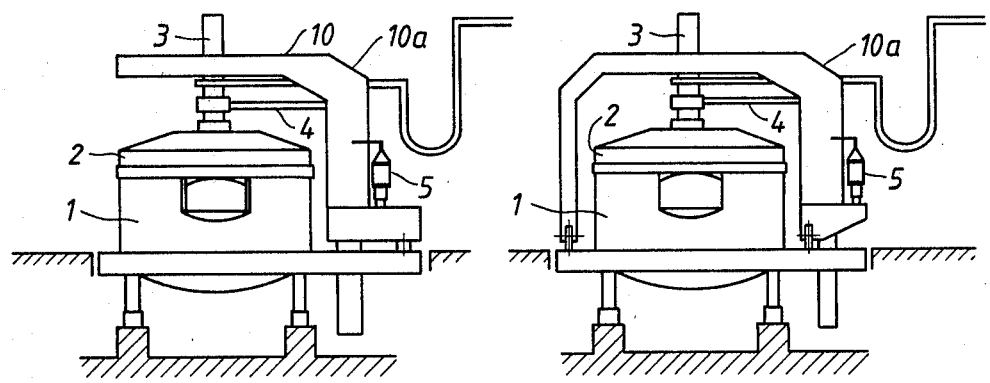
FIG. 1a
FIG. 1b
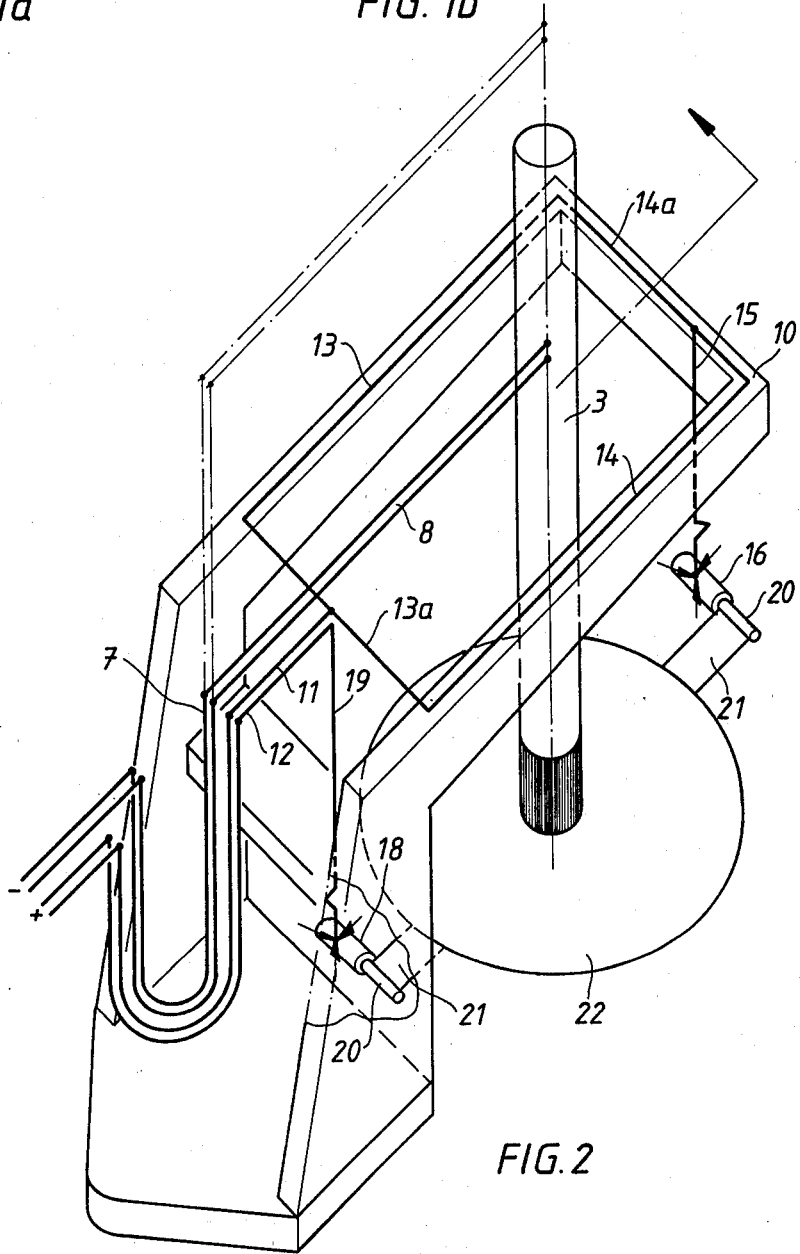
FIG. 2

DC ARC FURNACE POWER CONNECTION SYSTEM

A DC arc furnace conventionally comprises a furnace vessel having a hearth adapted to contain a melt and having a removable roof through which at least one arcing electrode depends centrally from a horizontal electrode arm extending over the roof from a location horizontally offset from the roof where the arm is supported by a mast adapted to raise and lower the arm and therefore the arcing electrode. It is necessary to raise the electrode free from the roof when the latter is removed.

The roof is removed by equipment including a horizontal rectangular frame having at least one end supported at the above offset location and sides extending over the roof to an end beyond the diametrically opposite sides of the roof. The frame ends and sides are spaced symmetrically around the electrode when the roof is in place with the electrode operating. This frame is connected to the roof and either swings arcuately or travels linearly, in both cases horizontally, the motion depending on whether the furnace is of the swing type or Gantry lift type.

DC arc power is provided by a negative power line connecting with the arcing electrode and a positive power line connecting with the melt in the hearth via a melt connection such as is exemplified by the Stenkvist Pat. No. 4,228,314 showing a melt connection symmetrically disposed in the hearth directly below the arcing electrode and two melt connection terminals extending diametrically opposite to each other away from the furnace bottom. With this arrangement the positive power line can connect with these two terminals via electrically parallel branch lines.

The above melt connection is one of a series of efforts intended to prevent the arc formed between the arcing electrode tip and the melt, from operating angularly and producing an arc flare directed at a localized portion of the furnace vessel lining and destroying that portion most rapidly while the balance of the lining remains in serviceable condition.

The following discloses an invention which comprises a power line connection system for a DC arc furnace which eliminates or reduces the arc angularity problem.

This invention is illustrated by the accompanying drawings in which:

FIG. 1a in elevation schematically shows a swing roof DC arc furnace;

FIG. 1b in the same way illustrates the Gantry lift type; and

FIG. 2 diagrammatically shows the principles of the invention.

Both furnace types use equivalent parts insofar as the present invention is concerned, and these parts are therefore identically numeraled in FIGS. 1a and 1b as follows:

1 is the cylindrical furnace vessel, 2 is the circular removable roof, 3 is the vertical arcing electrode depending from the horizontal electrode arm 4, and 5 represents the lifting mechanism for the arm and which is operated when the electrode 3 is moved upwardly and clear from the roof 2 for removal of the latter. This removal is effected by the roof removal equipment which in both instances includes the rectangular frame 10 connecting with the roof via suspension members (not shown). In the swing roof type this frame is in the form of a cantilever and swings in a horizontal plane, and in the Gantry lift type the frame is part of the Gantry crane and moves linearly. In both types the frame 10 has one end 10a connecting with its supporting and operating equipment and forming a location or point at that frame end where the negative power line connects via the electrode arm 4 with the arcing electrode, the positive power line going to the melt connection in various ways intended to avoid arc angularity. The melt connection terminals are not shown in FIGS. 1a and 1b.

Referring now to FIG. 2, with the present invention the positive and negative power lines extend together in the form of a flexible multi-conductor cable to the location or point 7. This location or point 7 is close to the furnace vessel and its roof. At this location the negative line connects with a conductor 8 extending from the location 7 straight to connection with the arcing electrode 3, preferably via the electrode arm 4 which is not shown in FIG. 2 to avoid a confusing illustration. This conductor 8 may be either a single or multiple conductor.

However, the positive power line is preferably a two conductor line because it must provide for two extensions 11 and 12. The extension 11 connects with a conductor forming a closed loop going around the electrode 3 via the ends and sides of the frame 10, this loop having sides 13 and 14 and ends 13a and 14a. The frame 10 is of oblong or elongated rectangular shape, and the conductor loop follows this configuration and can be fixed to the frame, the conductor being electrically insulated. The power line extension 11 connects with the end 13a of this conductor loop, and the loop end 14a connects with a conductor 15 which extends straight downwardly to a melt connection terminal 16 which is below that end of the loop. The extension 11 connects with the center of the loop end 13a and the conductor 15 connects with the center of the end 14a.

The positive power line extension 12 connects with a second melt connection terminal 18 which is below the end 13a of the loop; the connection being via a straight downwardly extending conductor 19 starting adjacent to the center of the loop end 13a. The terminals 16 and 18 are mechanically connected to the frame 10 as are the vertical conductors 15 and 19 and they all move with the furnace roof. The terminals 16 and 18 are made in the form of chucks which receive reciprocative connectors 20 which connect with strap conductors 21 extending from the melt connection 22, as shown, for example, in the Stenkvist Pat. No. 4,228,314. The parts 20 permit quick connection and disconnection with the melt connection terminals 16 and 18.

The arcing electrode 3, or electrodes if more than one is used, are concentric with the cylindrical furnace vessel 1 and its circular roof 2, and the frame 10 and, therefore, the conductor loop sides 13 and 14 and ends 13a and 14a, are symmetrically disposed about the arcing electrode 3. The vertical conductors 15 and 19 and the melt connection terminals 16 and 18 are disposed symmetrically with respect to the arcing electrode 3 as is the melt connection 22.

To summarize the foregoing, the negative power line connects with a first conductor 8 extending from the location 7 straight to connection with the electrode 3 via the electrode arm 4. The positive power line connects with a second conductor 19 extending straight downwardly from the location or point 7 to connection with the one of the terminals 18 below the location 7, and also with a third conductor forming the closed loop 13, 13a, 14 and 14a around the electrode via the ends and sides of the frame 10. This loop has one end adjacent to the location 7 with which the positive line directly connects via the extension 12 and an opposite end 14a from which a fourth connector 15 extends downwardly to connection with the one of the melt connection terminals 16 therebelow.

When in operation with the arc working the conductors required to power the melt and electrode are symmetrically disposed relative to the electrode and its arc, to a degree not heretofore possible. This prevents the magnetic fields from appreciably affecting the arc angularity as they otherwise do.

We claim:

1. A DC arc furnace having a removable roof through which an arcing electrode depends via a horizontal electrode arm extending over the roof from a location offset from the roof, roof-removing equipment including a horizontal frame having an end at said location and extending over the roof to an end beyond the opposite side of the roof via frame sides spaced on either side of said electrode, and a melt connection having terminals extending from the bottom of the furnace below the frame's ends; wherein the improvement comprises positive and negative DC power lines extending together to said location, the negative line connecting with a first conductor extending from said location straight to connection with said electrode via said electrode arm, and the positive line connecting with a second conductor extending downwardly from said location to connection with the one of said terminals therebelow and with a third conductor forming a closed loop around said electrode via the ends and sides of said frame, the loop having one end with which the positive line directly connects at said location and an opposite end from which a fourth conductor extends downwardly to connection with the one of said terminals therebelow.

2. The furnace of claim 1 in which said terminals and said second, third and fourth conductors are symmetrically disposed with respect to said electrode.

* * * * *